(12) United States Patent
He

(10) Patent No.: US 8,167,433 B2
(45) Date of Patent: May 1, 2012

(54) MOTORIZED ADJUSTABLE CONVERGENCE MECHANISM FOR PROJECTION DISPLAYS

(75) Inventor: Guo Qing He, Toronto (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 420 days.

(21) Appl. No.: 12/508,154

(22) Filed: Jul. 23, 2009

(65) Prior Publication Data

US 2011/0019157 A1    Jan. 27, 2011

(51) Int. Cl.
*G03B 21/14*    (2006.01)
(52) U.S. Cl. .............................. 353/33; 353/81; 359/831
(58) Field of Classification Search .................... 353/33, 353/81, 121, 122; 348/771; 359/831, 833, 359/834, 837; 349/5, 7, 8
See application file for complete search history.

(56) References Cited

U.S. PATENT DOCUMENTS

| | | | | |
|---|---|---|---|---|
| 6,181,490 | B1* | 1/2001 | Wun et al. ..................... | 359/822 |
| 6,422,704 | B1 | 7/2002 | Gyoten et al. | |
| 6,616,282 | B2* | 9/2003 | Ozawa .............................. | 353/33 |
| 6,639,743 | B2* | 10/2003 | Watanabe ..................... | 359/820 |
| 7,002,760 | B2 | 2/2006 | Von Poncet et al. | |
| 7,553,027 | B2* | 6/2009 | Tang et al. ....................... | 353/33 |
| 2002/0034023 | A1 | 3/2002 | Smith et al. | |
| 2004/0012982 | A1* | 1/2004 | Kim .............................. | 362/561 |
| 2005/0185145 | A1* | 8/2005 | Halsberghe et al. ............ | 353/33 |
| 2005/0195504 | A1* | 9/2005 | Von Poncet et al. .......... | 359/822 |

FOREIGN PATENT DOCUMENTS

| | | |
|---|---|---|
| EP | 0967808 A2 | 12/1999 |
| EP | 1569463 A2 | 8/2005 |

OTHER PUBLICATIONS

European Patent Application No. EP 10 25 1271 Search Report dated Nov. 11, 2010.

* cited by examiner

*Primary Examiner* — William C Dowling
(74) *Attorney, Agent, or Firm* — Perry+Currier Inc.

(57) ABSTRACT

A light engine for use in a projector, comprising a motorized adjustable convergence mechanism for fine adjusting the relative positions of red, green and blue channel sub-assemblies. Motors are mounted on fixed elements of the sub-assemblies for driving movable elements thereof, including imaging devices thereof such as digital micromirror devices.

9 Claims, 4 Drawing Sheets

MOTORIZED ADJUSTABLE CONVERGENCE MECHANISM FOR PROJECTION DISPLAYS

BACKGROUND OF THE INVENTION

1. Field of the Invention

The present invention is directed to digital projectors incorporating light engines with color splitting-converging prisms, and more particularly to a motorized adjustable convergence mechanism for adjusting the position of Digital Micromirror Device (DMD) sub-assemblies of a digital projector.

2. Description of the Related Art

A typical color digital projector consists of a lamp, an illumination system, and a color splitting-recombining light engine. The optical function of a light engine is to split uniform illumination light into Red/Green/Blue (ROB) channels, merging the three channels onto an imaging device or optical panel such as an LCD (Liquid Crystal Display) or DMD (Digital Micromirror Device), and then re-combining all three channels into a single illumination light beam that is projected on a screen via a projection lens.

The DMD is an electromechanical device consisting of millions of microscopic mirrors that modulates light by independently flipping each mirror through a +−12 degree angle. The design of the DMD requires creation of a light cone with an f/#2.4-2.5 for maximum light throughput in the projector. Using three such DMDs on a prism (e.g. Phillips® prism, plumbicon, etc.), a white light cone of f/2.4 can be separated into red, green, and blue. Each color is individually modulated by the DMD and then recombined by the prism.

The positions of red, green and blue DMDs are critical for correct colour convergence of the output image. For an optimal image, the same pixels from each of the red, green and blue DMDs must be 100% overlapped. In normal usage environments, convergence may drift (in the order of micrometers) as a result of environmental changes, vibration, etc., which can create unacceptable color separation. However, the light engines used in conventional projectors are located deep inside the projector and therefore hard to access, making convergence correction a difficult and time-consuming operation for service personnel in the field.

Accordingly, it is an objective of the present invention to provide a mechanism for convergence adjustment without requiring manual adjustment of the light engine.

SUMMARY OF THE INVENTION

Therefore, according to an aspect of the present invention, a motorized adjustable convergence mechanism is provided for adjusting the position of at least two DMD sub-assemblies of the light engine in a digital projector.

These together with other aspects and advantages that will be subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
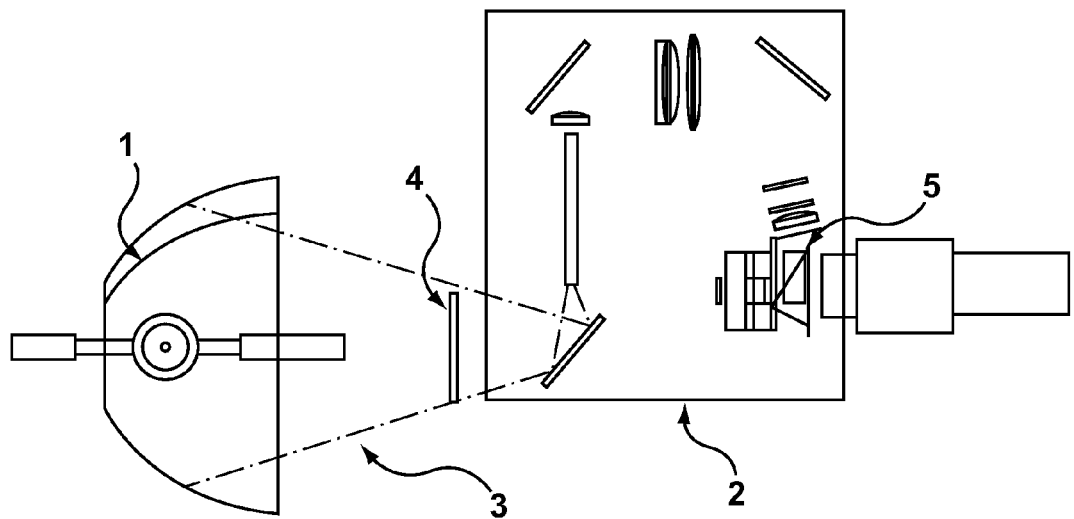
FIG. 1 is a digital projector, according to the prior art.
Figure 2:
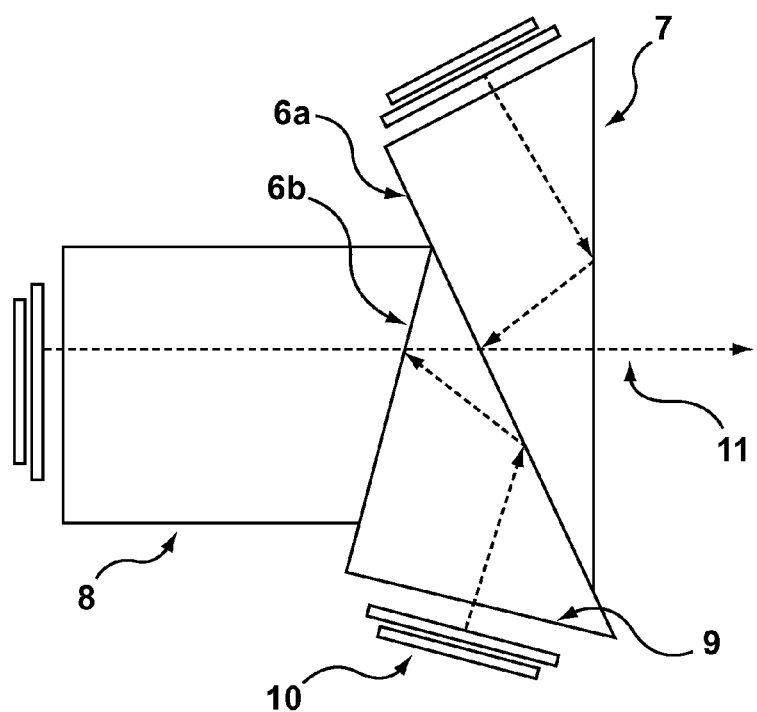
FIG. 2 is a schematic representation of a light engine with plumbicon prism and DMD, according to the prior art.

FIG. 1 shows a typical projector comprising a Xenon lamp and parabolic reflector (1) for creating a light cone (3) that passes through a UV filter (4) into an illumination system (2), including an integrator rod and lenses for telocentric illumination. A light engine (5) includes a color splitting-converging prism (typically a plumbicon prism) with three prism elements and respective red channel (9), green channel (8) and blue channel sub-assemblies (7), each of which includes an imaging device (10), as shown in FIG. 2. The prism elements contain dichroic coatings (6) to separate the incoming white light into blue, green, and red. Each color is then separately modulated at each imaging device (10), such as a DMD. According to the exemplary embodiment, the imaging devices (10) are DMDs. Accordingly, further reference to imaging devices (10) have been replaced by reference to DMDs, As discussed above, a DMD (10) is an electromechanical device that typically consists of millions of microscopic mirrors for modulating light by independently flipping each mirror through +−12 degree angle. Each DMD (10) reflects the modulated light, which is re-converged (11) by the prism and projected by a projection lens onto a screen to produce an image.

Figure 3:
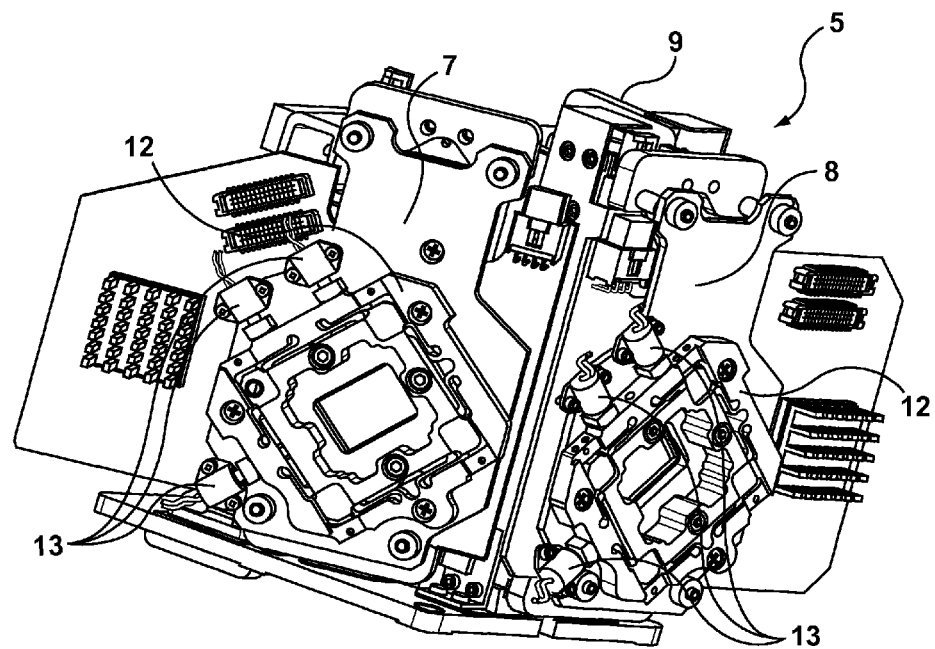
FIG. 3 is a perspective view of a light engine with motorized convergence mechanisms on two channels, according to an exemplary embodiment.

According to the exemplary embodiment, motorized convergence mechanisms are provided for field alignment of the colour channels in the event that the unit develops misconvergence of color. More particularly, as shown in FIG. 3, a pair of motorized mechanisms is provided for adjusting the position of two of the three channels of light engine (5) such that two channels are adjustable with reference to the third. In the exemplary embodiment, the red channel subassembly (9) remains fixed whereas the green channel subassembly (8) and blue channel subassembly (7) are provided with motorized convergence mechanisms (12).

Figure 4:
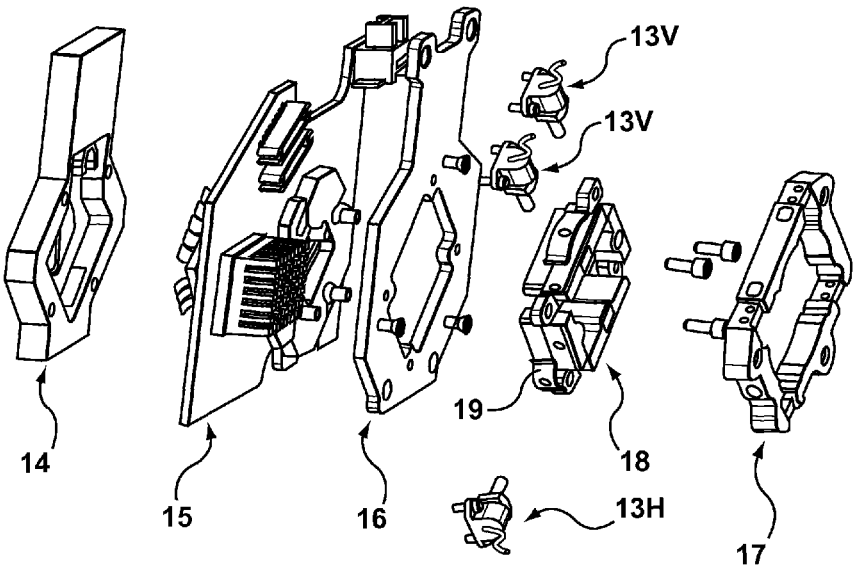
FIG. 4 is an exploded view of a single channel of the light engine in FIG. 3.

As shown best in FIG. 4, each of the blue (7) and green (8) channel assemblies includes movable elements and fixed elements, with motors (13) mounted on the fixed elements for driving the movable elements. The motors (13) may include, but are not limited to, high precision stepper motors or piezo-actuators. Sensors can also be used to provided position feedback.

The fixed elements include a DMD aperture and front air cooling channel (14), DMD and PCB assembly (15), socket mounting plate (16) and fixed stage frame (17). The socket mounting plate (16) is mounted to the prism (not shown in FIGS. 3-6). A pair of vertical adjustment motors (13V), and a horizontal adjustment motor (13H) are mounted to the socket mounting plate (16) for adjusting the position of a floating plate (18) that houses the DMD (10) and associated components.

Figure 5:
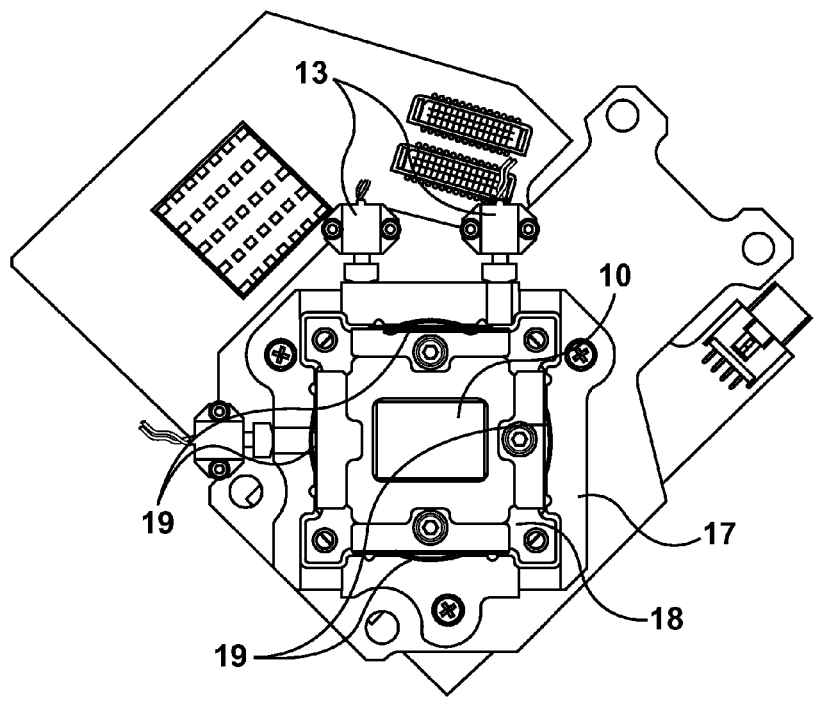
FIG. 5 is rear elevation view of the single channel shown in FIG. 4.
Figure 6:
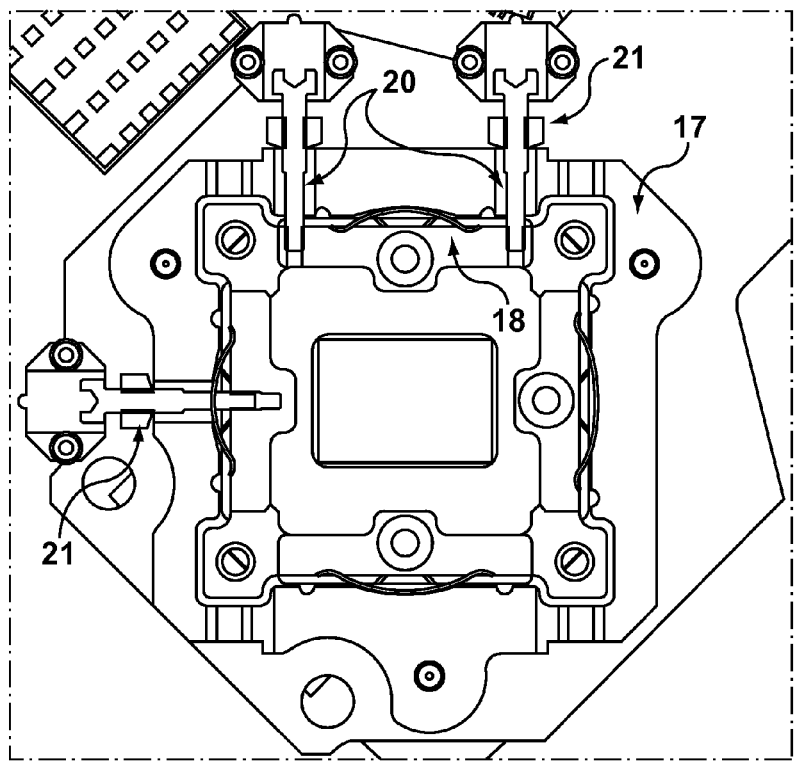
FIG. 6 is a partial fragmentary view thereof.

As shown in FIGS. 5 and 6, the floating plate (18) includes leaf springs (19) that contact inner surfaces of the fixed stage frame (17) for minimizing backlash. Motor shafts (20) are threaded and pass though holes in the fixed stage frame and thence into threaded holes in the floating plate (18). Each motor shaft (20) includes a pair of differential threads. A first thread (e.g. M2.5×0.45) is threaded into the floating plate (18)

while the other thread (e.g. M3×0.5) is mated with a thread compensator (21) that constantly pulls the fixed stage frame (17) against leaf springs (19). The two threads are preferably of the same thread type (right hand or left hand) but have different pitches, such that turning the shaft (20) one revolution results in adjustment of the relative position between the fixed stage frame (17) and movable floating plate (18) according to the difference of pitches (e.g. 0.5−0.45=0.05), as described for example in U.S. Pat. No. 5,596,404, issued Jan. 21, 1997.

In order to adjust the orientation of DMD (10), a technician actuates buttons on a user interface (UI) or remote device, for providing input signals to control the motors (13). For vertical translation, motors (13V) are activated to move the floating plate (18) upwardly or downwardly whereas for horizontal translation, motor (13H) is activated to move the floating plate (18) left or right. In order to rotate the floating plate (18), motors (13V) are activated in opposite directions.

Figure 7A:
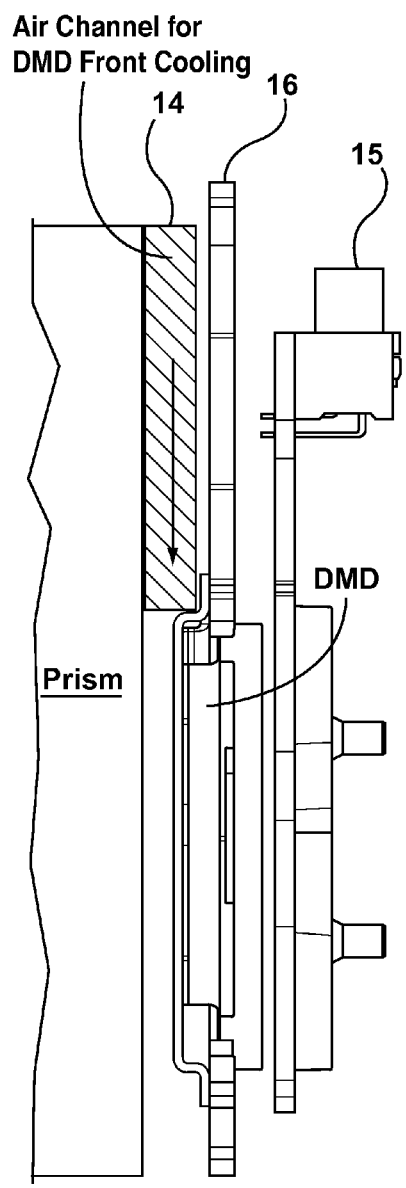
FIG. 7A is a cross-section view of a light engine according to the prior art.
Figure 7B:
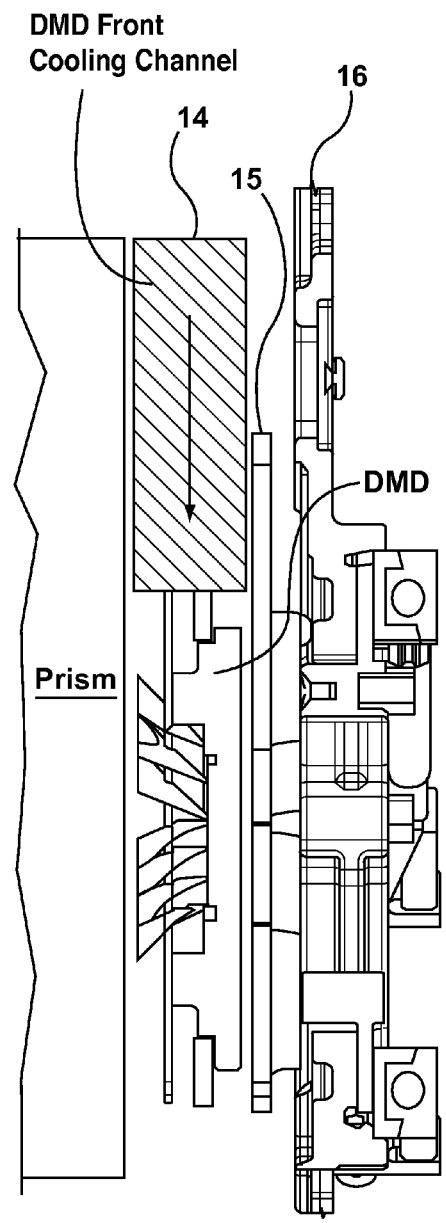
FIG. 7B is a cross-section view of a light engine according to the exemplary embodiment of FIGS. 3-6.

An additional advantage of the configuration depicted in FIGS. 3-6, is that additional space is provided, as shown in FIG. 7B, for cooling on the front side of the DMD (10), than prior art designs, as shown in FIG. 7A. Consequently, the DMD (10) and prism are less sensitive to thermal changes than prior art designs. In particular, compared to the conventional light engine design of FIG. 7A, the socket mounting plate (16) is located further from the prism, on the other side of the PCB assembly (15), such that the space between the PCB assembly (15) and prism is greater thereby allowing more space for the air cooling channel.

The many features and advantages of the invention are apparent from the detailed specification and, thus, it is intended by the appended claims to cover all such features and advantages. For example, although the exemplary embodiment relates to a convergence mechanism for DMDs, the principles set forth herein apply equally to LCD and LCoS, and other similar technologies. Further, since numerous modifications and changes will readily occur to those skilled in the art, it is not desired to limit the invention to the exact construction and operation illustrated and described, and accordingly all suitable modifications and equivalents may be resorted to, falling within the scope of the claims.

What is claimed is:

1. A light engine for use in a projector, comprising:
a prism for receiving and separating white light into blue, green, and red light;
a plurality of channel subassemblies having imaging devices for receiving, modulating and reflecting said red, green and blue light back to said prism, which in response re-converges said light for projection onto a screen to produce an image;
at least two of said channel subassemblies being provided with motorized convergence mechanisms for adjusting the orientation of respective ones of said imaging devices for convergence correction of the image projected on said screen, wherein each of said channel subassemblies includes a plurality of fixed elements, at least one movable element housing a respective one of said imaging devices, and a plurality of motors mounted to said fixed elements for driving said at least one movable element, wherein said at least one movable element is a floating plate and said fixed elements include a mounting plate mounted to the prism and supporting each respective one of said motors and a fixed stage frame mounted to said mounting plate and circumscribing said floating plate, wherein said motors include a pair of vertical adjustment motors for vertical and rotational adjustment of said floating plate, and a horizontal adjustment motor for horizontal adjustment of said floating plate, and wherein said floating plate includes a plurality of leaf springs that contact inner surfaces of said fixed stage frame for minimizing backlash.

2. The light engine of claim 1, wherein said motors include threaded motor shafts extending through said fixed stage frame and into threaded holes in said floating plate.

3. The light engine of claim 2, wherein said motor shafts include a pair of differential threads, a first one of said threads being threaded into said floating plate and the other one of said threads being mated with a thread compensator that pulls said fixed stage frame against said leaf springs.

4. The light engine of claim 3, wherein said first and said other one of said threads are of the same thread type but have different pitches, such that each rotation of each of said shafts results in adjustment of the relative position between the fixed stage frame and floating plate according to the difference of said pitches.

5. The light engine of claim 1, wherein two of said channel subassemblies being provided with motorized mechanisms for adjusting the orientation of a respective two of said imaging devices relative to a third one of said channel subassemblies.

6. The light engine of claim 5, wherein said modulating said two channel subassemblies are green and blue channel subassemblies.

7. The light engine of claim 1, wherein said imaging devices are digital micromirror devices.

8. The light engine of claim 1, wherein said motors are high precision stepper motors.

9. The light engine of claim 1, wherein said motors are piezo-actuators.

* * * * *